United States Patent Office 3,004,114
Patented Oct. 10, 1961

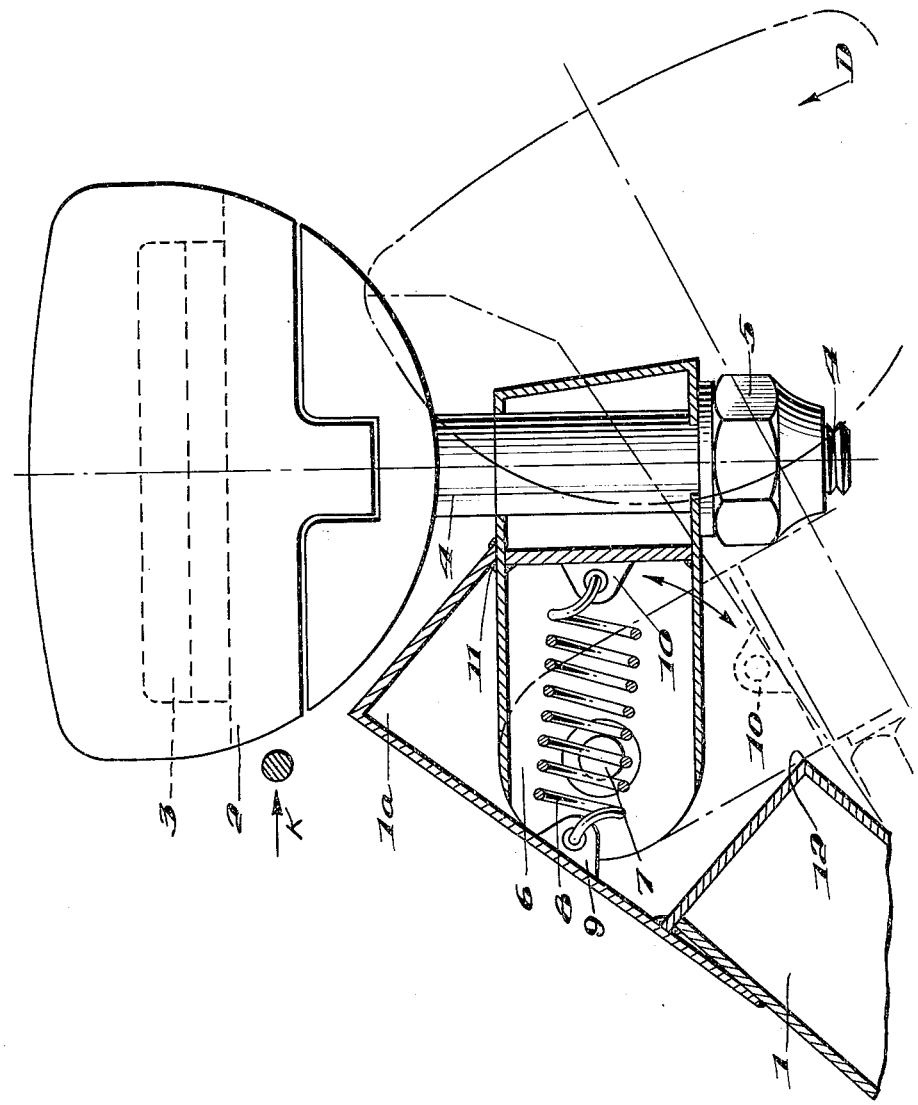

3,004,114
METHOD OF FASTENING THE COLLECTOR HEAD ON THE COLLECTOR BAR OF A TROLLEY CAR
Werner Früh, Zurich, Switzerland, assignor to Aktiengesellschaft Brown, Boveri & Cie., Baden, Switzerland, a joint stock company
Filed May 8, 1959, Ser. No. 811,843
Claims priority, application Switzerland May 17, 1958
1 Claim. (Cl. 191—59.1)

In the operation of trolley cars it can happen on wide streets or places that the driver is forced to pull the car too far from the trolley wire, thus removing the collector arm from the wire. In order to prevent an accident, most trolley buses are provided with devices to prevent the collector bars from jumping up into the end position. Such devices return the bars, after covering a certain free path, to a level at which the collector head is located considerably under the trolley wires, and thus also under the supporting construction. The object of these devices is to avoid that collector bars can damage or pull down parts of the trolley wire, particularly insulators and cross wires.

However, it takes a certain time to remove the collector bars—according to the above described process—out of the range of the trolley wire. During this time the car continues its movement, frequently at an increased speed, so that the bars come into very harsh contact with the cross wire, in spite of such safety measures. Due to the easy rotatability of the collector head, the latter can be so caught on a cross wire that the wire breaks. Such a breakage of a line suspension produces great vibrations in the trolley wires which lead frequently to short circuits so that the trolley wires break and fall down on the road. Such situations lead not only to great traffic jams but unfortunately also to serious injuries to pedestrians.

It has been suggested to secure the head holder on the bar by means of thin pins, bolts or screws, and to connect the head or its holder with the bar by a strong and flexible element. The object of this device is to shear the thin pins, bolts or screws when the head strikes against a cross wire, thus preventing the head from falling down through the strong and flexible connection with the bar.

Various shortcomings of this solution appeared in practice. On the one hand, it is not a simple matter to secure the head by new pins or screws, for example under weak or poor lighting conditions. Besides, this work requires much time and also a corresponding interruption of traffic. On the other hand, the connection of the head with the bar by means of such a shearing pin or shearing-screw is not reliable, because they are highly stressed in normal operation, so that after a certain time they break by themselves.

The problem underlying the invention can be seen from the description of the possible processes after the collector arm has jumped off the line. It consists in avoiding, by means of an additional new device associated with the collector arm, that the collector head is caught or stuck on a cross suspension. The solution of this problem, according to the invention, is made possible by a device which is provided between the collector bar and the head, on which device the head is secured in usual manner. This head carrier is pivotally mounted in the vertical plane on the bar (or, on a part which is rigidly connected with the bar), and is under the action of the force of an elastic means so that the head is pressed or pulled—by an outer force acting on it—only into one or the other end position, limited by stops, and retained in this position by the elastic means, so that in one end position each part of the head lies underneath the upper limiting surface of the collector bar or parts thereof.

A device according to the invention is represented schematically by way of an example in the attached drawing, partly in longitudinal section and partly in side view. In this graphic representation, the collector head is shown in operating position, i.e., in one end position, by means of solid lines and in the other end position by broken lines.

Reference numeral 1 denotes a collector bar on which the usual protective part 1a of a collector head is secured with parallel jaws in the vertical plane. The collector head 2, with the dotted sliding piece 3, is secured to a collector head carrier 6, by a bolt 4 and nut 5. For this carrier there can be used a hollow body, for example a tube with a square or rectangular cross-section, and the latter is so dimensioned that it is conducted laterally through the parallel jaws of the protective part 1a. The carrier 6 is pivotally mounted on the protective part 1a by means of two pins 7. Between the inner heads of the bearing pins is a free space within which an elastic means, for example a spiral tension spring 8, can move freely. This spring 8 is secured, on the one hand, in the interior of the bar 1—or, on the protective part 1a—on a holding element 9 and, on the other hand, on a similar part 10, on the carrier 6. In the operating position of the head, the longitudinal axis of spring 8 lies above the axis of the two bearing pins 7. The force of the spring 8 thus tends to turn the carrier 6 counterclockwise. The carrier is thus pressed against the end stop 11.

If a collector arm jumps off the trolley wire and the head strikes against a cross wire, the carrier is turned by this outer force K about the pins 7 and retained at the stop 12, by the force of the spring 8.

It can be seen from the drawing that each part of the head is in this position underneath the upper cross-sectional limiting surface of the protective part 1a. It is thus impossible that the head be caught in the cross wire and this part of the line be torn down.

The head is brought again into the operating position by a pressure D which can be done rapidly by hand without any tools, as it can be readily seen. Interruption of the traffic is thus impossible by the device according to the invention.

It will be clearly apparent from the description of the solution that the object of the device according to the invention can also be achieved by any other type of elastic means which exercises force between the bar and the holder of the head. Thus, it is possible to use tension- or compression-springs or elastic means, such as rubber and the like. It is also possible to use combinations of metal springs with rubber or plastic elements. The concept of the solution is thus not limited to the spiral tension spring shown in the drawing.

I claim:

Attachment of a current collector head on a current collector bar of an electrically driven vehicle, said current collector bar having a protective part at its upper end, comprising a collector head support member to one end of which such head is fixed, pivotal means for securing an opposite end of said support member to said bar within said protective part of said bar, said pivotal securing means permitting rotation of said support member in a vertical plane, an upper stop means associated with said bar for limiting upward rotation of said support member in said plane to operating position of said head, a lower stop means associated with said bar for limiting downward rotation of said support member in said plane to an inclined position in which each part of said head is at a level below that of the top of said protective part of said bar, and an elastic biasing means centrally located within said support member, said elastic biasing means biasing said support member when in said operating position towards said upper stop means and when in said inclined position towards said lower stop means.

(References on following page)

References Cited in the file of this patent

UNITED STATES PATENTS

| | | |
|---|---|---|
| 837,836 | Holmes et al. | Dec. 4, 1906 |
| 954,014 | Bayley | Apr. 5, 1910 |

FOREIGN PATENTS

| | | |
|---|---|---|
| 173,031 | Austria | Nov. 10, 1952 |
| 228,273 | Great Britain | Feb. 3, 1925 |
| 502,216 | Italy | Nov. 29, 1954 |